US010089386B2

(12) United States Patent
Lim et al.

(10) Patent No.: US 10,089,386 B2
(45) Date of Patent: Oct. 2, 2018

(54) METHOD AND DEVICE FOR PROVIDING CORRECT ANSWER KEYWORD

(71) Applicant: NAVER CORPORATION, Seongnam-si (KR)

(72) Inventors: Joong Sun Lim, Seongnam-si (KR); In Jae Sung, Seongnam-si (KR); Hannuri Ha, Seongnam-si (KR); Young Ho Na, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 236 days.

(21) Appl. No.: 15/235,978

(22) Filed: Aug. 12, 2016

(65) Prior Publication Data

US 2016/0350408 A1 Dec. 1, 2016

Related U.S. Application Data

(63) Continuation of application No. PCT/KR2015/002170, filed on Mar. 6, 2015.

(51) Int. Cl.
*G06F 17/30* (2006.01)

(52) U.S. Cl.
CPC .. *G06F 17/30684* (2013.01); *G06F 17/30657* (2013.01); *G06F 17/30693* (2013.01); *G06F 17/30696* (2013.01)

(58) Field of Classification Search
CPC ............. G06F 17/3097; G06F 17/3064; G06F 17/30684; G06F 17/30657; G06F 17/30696

(Continued)

(56) References Cited

U.S. PATENT DOCUMENTS

2007/0150342 A1* 6/2007 Law ........................ G06Q 30/02
705/14.52
2007/0162379 A1* 7/2007 Skinner .................. G06Q 30/02
705/37

(Continued)

FOREIGN PATENT DOCUMENTS

JP          2002-92032      3/2002
JP          2004-310404     11/2004

(Continued)

OTHER PUBLICATIONS

ISR issued in Int'l. App. No. PCT/KR2015/002170, dated May 18, 2015.

*Primary Examiner* — Dung K Chau
(74) *Attorney, Agent, or Firm* — Greer Burns & Crain Ltd.

(57) ABSTRACT

Provided is a method of providing an answer keyword, the method including: obtaining at least one of a search word history including a first inquiry search word of a certain domain pre-received from first user terminals, and webpage information selected by the first user terminals from a search result according to the search word history; extracting answer candidate keywords regarding the first inquiry search word from at least one of the search word history and the webpage information based on keyword lists of the certain domain; calculating a relation between the first inquiry search word and each of the extracted answer candidate keywords; and when the first inquiry search word is received from a second user terminal, transmitting answer keywords for the first inquiry search word, which are selected from the answer candidate keywords based on the relation, to the second user terminal.

17 Claims, 12 Drawing Sheets

(58) Field of Classification Search
USPC .......... 707/730, 706, 769, 999.003, 999.006; 715/234; 705/14.52, 37
See application file for complete search history.

(56) References Cited

U.S. PATENT DOCUMENTS

| | | | |
|---|---|---|---|
| 2009/0192994 A1* | 7/2009 | Kawaguchi | G06F 19/3481 |
| 2010/0094896 A1* | 4/2010 | Ozawa | G06F 17/30392 |
| | | | 707/769 |
| 2011/0231432 A1* | 9/2011 | Sata | G06F 17/2735 |
| | | | 707/769 |
| 2012/0290553 A1* | 11/2012 | England | G06Q 30/0282 |
| | | | 707/706 |
| 2014/0143224 A1* | 5/2014 | Allawi | G06F 17/30663 |
| | | | 707/706 |
| 2015/0106687 A1* | 4/2015 | McLaughlin | G06Q 30/02 |
| | | | 715/234 |

FOREIGN PATENT DOCUMENTS

| | | |
|---|---|---|
| KR | 10-2012-0023266 | 3/2012 |
| KR | 10-2012-0061133 | 6/2012 |

\* cited by examiner

FIG. 5

| FIRST USER TERMINAL | FIRST INQUIRY SEARCH WORD | ANSWER CANDIDATE KEYWORD |
|---|---|---|
| A | GIFT FOR MOTHER | (SULWHASOO, BB CREAM, DAKS SCARF, COACH BAG, COACH STORE ⋯) |
| B | GIFT FOR MOTHER | (COACH BAG, COACH TOTE BAG, DAKS BAG, DAKS WALLET ⋯) |
| C | GIFT FOR MOTHER | (DAKS SCARF, LAPTOP, CELL PHONE⋯) |
| D | GIFT FOR MOTHER | (MASSAGER, BROOCH, PERFUME ⋯) |
| ⋯ | ⋯ | ⋯ |

FIG. 6A

| GIFT FOR MOTHER | DAKS SCARF | BROOCH | COACH BAG | SULWHASOO | ⋮ |
|---|---|---|---|---|---|
| | 20 | 19 | 20 | 27 | ⋮ |

FIG. 6B

| GIFT FOR MOTHER | DAKS SCARF | BROOCH | COACH BAG | SULWHASOO | ⋮ |
|---|---|---|---|---|---|
| | 11.3 | 5.3 | 9.3 | 21.3 | ⋮ |

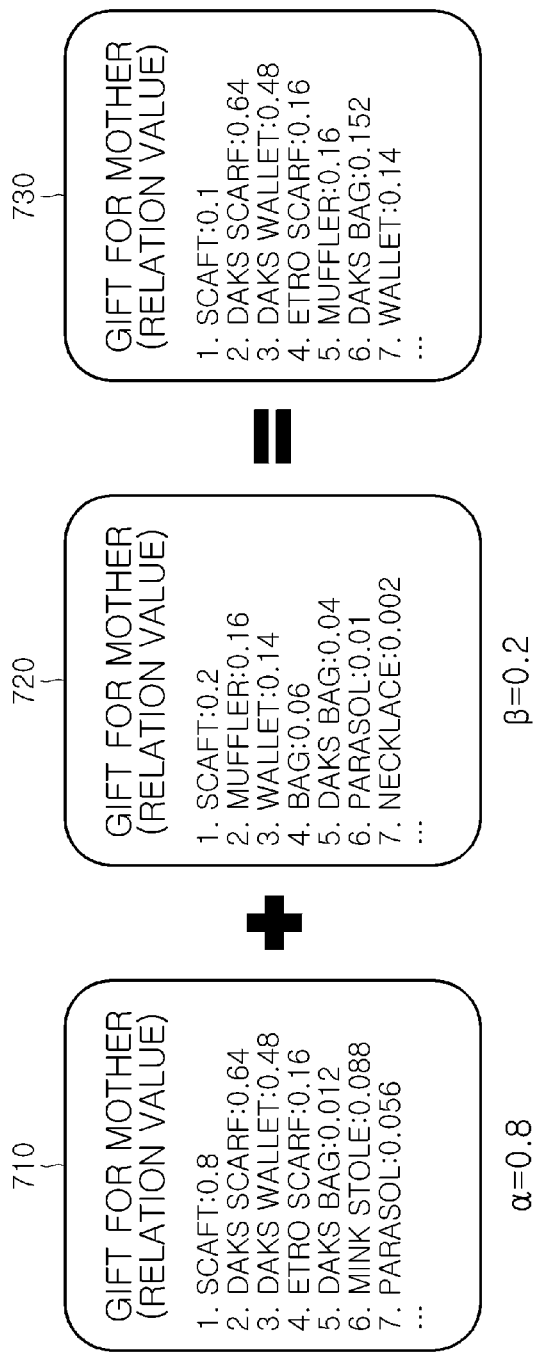

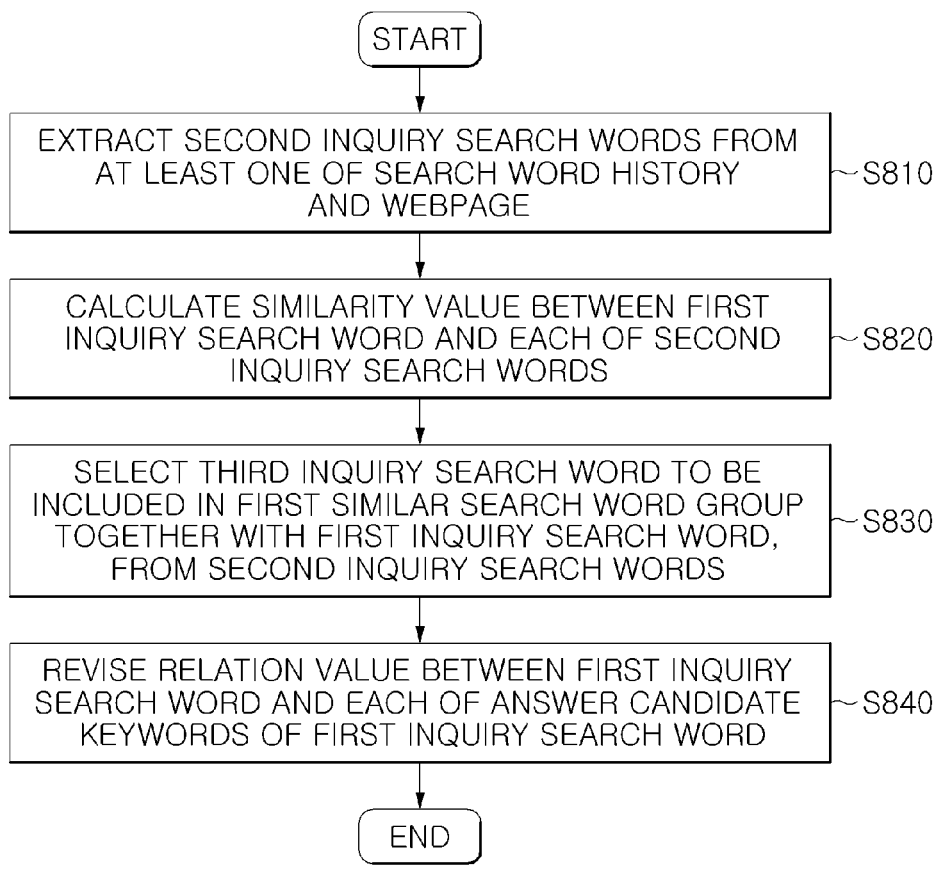

FIG. 9A

| FIRST USER TERMINAL | INQUIRY SEARCH WORD |
|---|---|
| A | GIFT FOR MOTHER, BIRTHDAY GIFT FOR MOTHER, BAG GIFT FOR MOTHER |
| B | GIFT FOR MOTHER, GIFT FOR HUSBAND'S MOTHER |
| C | GIFT FOR HUSBAND'S MOTHER, GIFT FOR MOTHER, GIFT FOR MOM IN FIFTIES, GIFT FOR MOTHER IN FIFTIES |
| D | GIFT FOR WIFE'S MOTHER, GIFT FOR MOTHER, GIFT FOR WOMEN IN SIXTIES |
| ... | ... |

FIG. 9B

| | GIFT FOR HUSBAND'S MOTHER | BIRTHDAY GIFT FOR MOM | GIFT FOR MOTHER'S 60TH BIRTHDAY | ... |
|---|---|---|---|---|
| GIFT FOR MOTHER | 40 | 120 | 81 | ... |

FIG. 12A

| SECOND INQUIRY SEARCH WORD | SECOND SIMILAR SEARCH WORD GROUP |
|---|---|
| GIFT FOR HUSBAND'S MOTHER | GIFT FOR MOTHER, GIFT FOR HUSBAND'S MOM, GIFT FOR WIFE'S MOM, GIFT FOR WIFE'S MOTHER, GIFT FOR HUSBAND'S FAMILY, GIFT FOR MOMMY, ... |
| BIRTHDAY GIFT FOR MOM | BIRTHDAY GIFT FOR MOTHER, BAG GIFT FOR MOM'S BIRTHDAY GIFT FOR MIDDLE-AGED WOMEN, WALLET GIFT FOR MOM, ... |
| 60TH BIRTHDAY GIFT | LUXURY GIFT FOR PEOPLE IN SIXTIES, BAG GIFT FOR PEOPLE IN SIXTIES, GIFT FOR MOTHER IN SIXTIES, GIFT FOR 60TH BIRTHDAY, BAG GIFT FOR 60TH BIRTHDAY, ... |
| ... | ... |

FIG. 12B

| | GIFT FOR HUSBAND'S MOM | BIRTHDAY GIFT FOR MOM | GIFT FOR MOTHER'S 60TH BIRTHDAY | ... |
|---|---|---|---|---|
| GIFT FOR MOTHER | 20 | 30 | 21 | ... | ns
METHOD AND DEVICE FOR PROVIDING CORRECT ANSWER KEYWORD

CROSS-REFERENCE TO RELATED APPLICATION

This application is a continuation of International Application No. PCT/KR2015/002170 filed on Mar. 6, 2015, claiming the priority based on Korean Patent Application No. 10-2014-0027321 filed on Mar. 7, 2014, the entire disclosures of which are incorporated herein by reference.

TECHNICAL FIELD

The present invention relates to a method and a device for providing an answer keyword, and more particularly, to a method and a device for providing an answer keyword, wherein an answer keyword related to an inquiry search word received from a user terminal is transmitted to the user terminal.

BACKGROUND OF THE INVENTION

As users actively search for information using portal sites, companies operating the portal sites are trying to provide accurate answers to the users regarding inquiry search words of the users. For example, a system for providing an answer keyword provides information having high preference of the users regarding the inquiry search words of the users as search results.

FIG. 1 is a diagram of an answer keyword 12 provided to a user terminal 10 by a system for providing an answer keyword. In FIG. 1, "birthday gift for mom" input to a search window are inquiry search words 11, and "Daks scarfs," "secret capsules," "hand lotions," "Chanel lipsticks," and "Metrocity scarfs" are the answer keywords 12. The system may provide answer keywords that are accurate and have high preference of users with respect to an inquiry search word of the users, so as to increase reliability of the users on search results.

SUMMARY OF THE INVENTION

One or more embodiments of the present invention provide a method and a device for providing an answer keyword, which provide, to users, an answer keyword having high preference regarding an inquiry search word of the users.

Also, one or more embodiments of the present invention provide a method and device for providing an answer keyword, which effectively handle abusing of a certain user.

According to the present invention, a method and a device for providing an answer keyword may provide, to users, an answer keyword having high preference regarding an inquiry search word of the users.

Also, according to the present invention, a method and device for providing an answer keyword may effectively handle abusing of a certain user.

DESCRIPTION OF THE DRAWINGS

FIG. 5 is a table of answer candidate keywords extracted from a search word history of first user terminals.

FIG. 6A is a table of frequencies of answer candidate keywords in a search word history, and FIG. 6B is a table of distance indexes between answer candidate keywords and a first inquiry search word.

FIG. 7 is a diagram for describing a method of calculating a relation value by using a first sub-relation value and a second sub-relation value.

FIG. 8 is a flowchart of a method of revising a relation value in a method of providing an answer keyword, according to an embodiment of the present invention.

FIG. 9A is a table of inquiry search words included in a search history received from a first user terminal, and FIG. 9B is a table of frequencies of second inquiry search words in a search history.

FIGS. 12A and 12B are tables for describing a method of revising similarity values between a first inquiry search word and second inquiry search words.

DETAILED DESCRIPTION OF THE INVENTION

Figure 1:
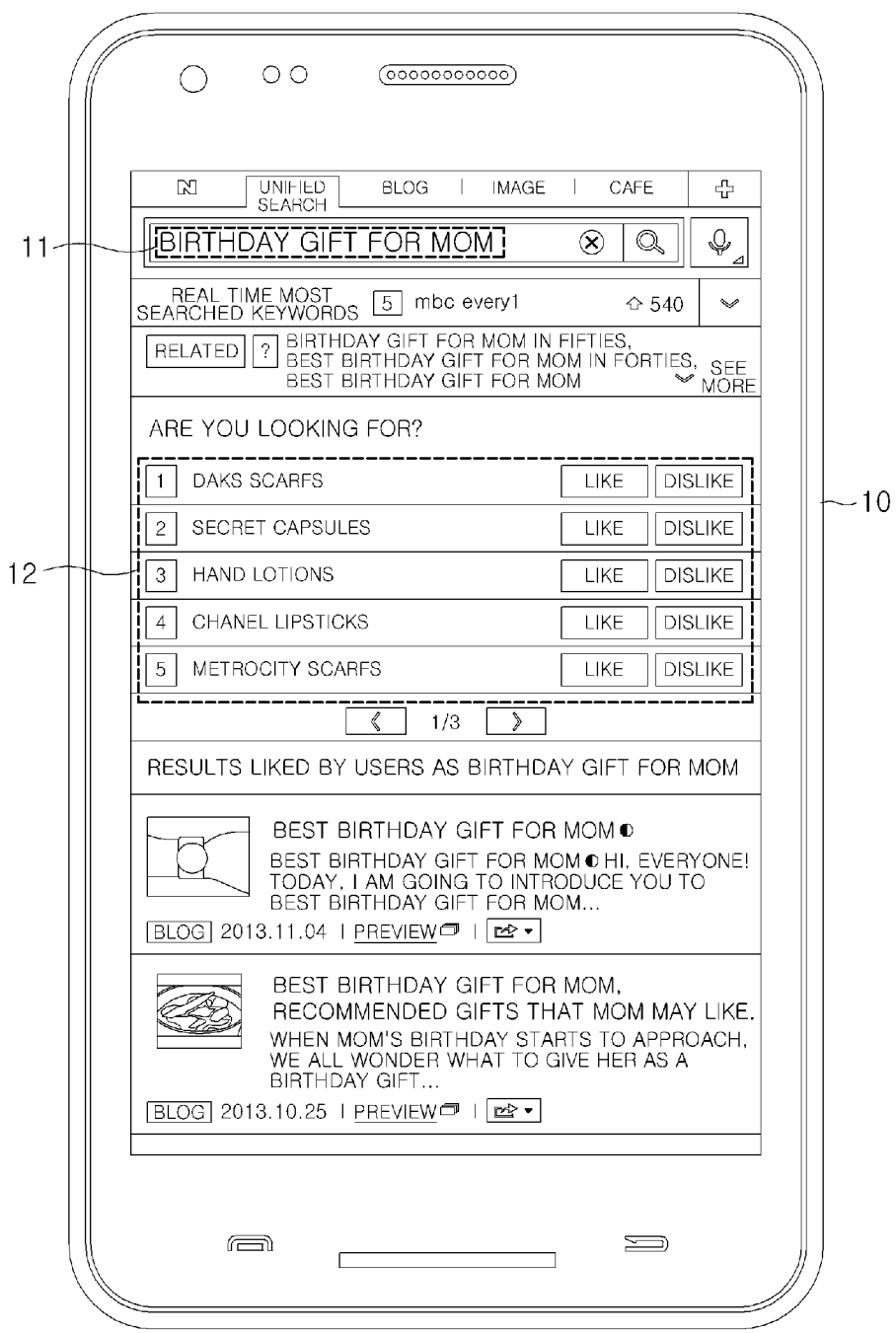
FIG. 1 is a diagram of an answer keyword provided to a user terminal by a system for providing an answer keyword.

According to an aspect of the present invention, there is provided a method of providing an answer keyword, the method including: obtaining at least one of a search word history including a first inquiry search word of a certain domain pre-received from first user terminals, and webpage information selected by the first user terminals from a search result according to the search word history; extracting answer candidate keywords regarding the first inquiry search word from at least one of the search word history and the webpage information based on keyword lists of the certain domain; calculating a relation value between the first inquiry search word and each of the extracted answer candidate keywords; and when the first inquiry search word is received from a second user terminal, transmitting answer keywords for the first inquiry search word, which are selected from the answer candidate keywords based on the relation value, to the second user terminal.

The calculating of the relation value may include selecting a certain number of the answer keywords from the answer candidate keywords in an order from high to low relation value.

The method may further include: changing a relation value of each of the answer keywords according to feedback of the second user terminal regarding the transmitted answer keywords; and reselecting the answer keywords from the answer candidate keywords based on the changed relation value of each of the answer keywords.

The calculating of the relation value may include calculating the relation value based on frequencies of the answer candidate keywords in at least one of the search word history and the webpage information.

The calculating of the relation value may include: calculating a first sub-relation value between the first inquiry search word and the answer candidate keywords based on frequencies of the answer candidate keywords in the search word history; calculating a second sub-relation value between the first inquiry search word and the answer candidate keywords based on frequencies of the answer candidate keywords in the webpage information; and calculating the relation value through linear combination of the first sub-relation value and the second sub-relation value.

The calculating of the first sub-relation value may include calculating the first sub-relation value by further considering a distance value between the first inquiry search word and the answer candidate keywords in the search history.

The calculating of the relation value may include: extracting second inquiry search words excluding the first inquiry search word from at least one of the search word history and the webpage information; calculating similarity value between the first inquiry search word and each of the extracted second inquiry search words based on a frequency of each of the second inquiry search words in at least one of the search word history and the webpage information; selecting a third inquiry search word from the second inquiry search words, which is to be included in a first similar search word group together with the first inquiry search word, based on the similarity value; and revising the calculated relation value between the first inquiry search word and each of the answer candidate keywords of the first inquiry search word based on a relation value between the third inquiry search word and each of answer candidate keywords of the third inquiry search word.

The selecting of the third inquiry search word may include: revising the similarity value between the first inquiry search word and each of the second inquiry search words based on a number of inquiry search words commonly existing in the first similar search word group and a second similar search word group of each of the second inquiry search words; and selecting the third inquiry search word based on the revised similarity value.

According to another aspect of the present invention, there is provided a computer-readable recording medium having recorded thereon a computer program, which when executed by a computer, performs the method of providing answer keywords described above.

According to another aspect of the present invention, there is provided a device for providing an answer keyword, the device including: an information obtainer configured to obtain at least one of a search word history including a first inquiry search word of a certain domain pre-received from first user terminals, and webpage information selected by the first user terminals from a search result according to the search word history; an extractor configured to extract answer candidate keywords regarding the first inquiry search word from at least one of the search word history and the webpage information based on keyword lists of the certain domain; a relation value calculator configured to calculate a relation value between the first inquiry search word and each of the extracted answer candidate keywords; a receiver configured to receive the first inquiry search word from a second user terminal; and a transmitter configured to transmit answer keywords for the first inquiry search word, which are selected from the answer candidate keywords based on the relation value, to the second user terminal.

The relation value calculator may select a certain number of the answer keywords from the answer candidate keywords in an order from high to low relation value.

The relation value calculator may change a relation value of each of the answer keywords according to feedback of the second user terminal regarding the transmitted answer keywords, and reselect the answer keywords from the answer candidate keywords based on the changed relation value of each of the answer keywords.

The relation value calculator may calculate the relation value based on frequencies of the answer candidate keywords in at least one of the search word history and the webpage information.

The relation value calculator may calculate a first sub-relation value between the first inquiry search word and the answer candidate keywords based on frequencies of the answer candidate keywords in the search word history, calculate a second sub-relation value between the first inquiry search word and the answer candidate keywords based on frequencies of the answer candidate keywords in the webpage information, and calculate the relation value through linear combination of the first sub-relation value and the second sub-relation value.

The relation value calculator may calculate the first sub-relation value by further considering a distance value between the first inquiry search word and the answer candidate keywords in the search history.

The extractor may extract second inquiry search words excluding the first inquiry search word from at least one of the search word history and the webpage information, and the relation value calculator may calculate similarity value between the first inquiry search word and each of the extracted second inquiry search words based on a frequency of each of the second inquiry search words in at least one of the search word history and the webpage information, select a third inquiry search word from the second inquiry search words, which is to be included in a first similar search word group together with the first inquiry search word, based on the similarity value; and revise the calculated relation value between the first inquiry search word and each of the answer candidate keywords of the first inquiry search word based on a relation value between the third inquiry search word and each of answer candidate keywords of the third inquiry search word.

The relation value calculator may revise the similarity value between the first inquiry search word and each of the second inquiry search words based on a number of inquiry search words commonly existing in the first similar search word group and a second similar search word group of each of the second inquiry search words, and select the third inquiry search word based on the revised similarity value.

While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims. Throughout the specifications, the same reference numerals will refer to the same elements.

According to exemplary embodiments of the present invention, the word "unit" may refer to a software component or hardware component such as an FPGA or ASIC capable of carrying out a function or an operation. However, "unit" is not limited to hardware or software. A unit may be configured so as to reside in an addressable storage medium or to drive one or more processors. Units may refer to software components, object-oriented software components, class components, task components, processes, functions, attributes, procedures, subroutines, program code segments, drivers, firmware, microcode, circuits, data, databases, data structures, tables, arrays or variables. A function provided by a component or unit may be a combination of smaller components or units, and may be combined with others to compose large components or units, or further divided into units along with other components.

Figure 2:
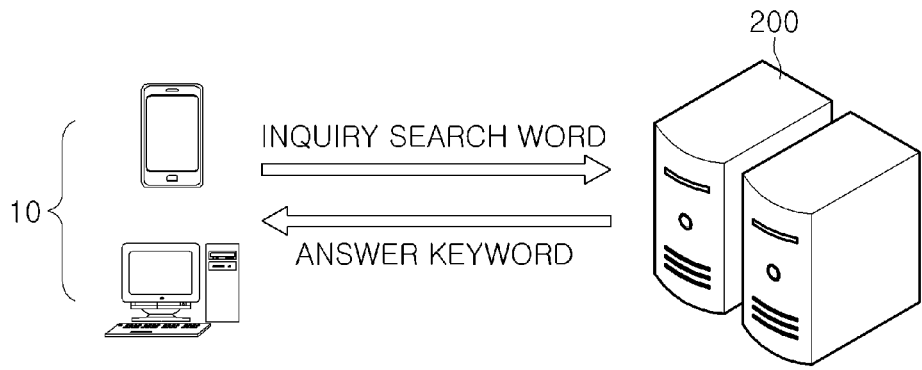
FIG. 2 is a schematic diagram of a device for providing an answer keyword and a user terminal, according to an embodiment of the present invention.

FIG. 2 is a schematic diagram of a device 200 for providing an answer keyword and user terminals 10, according to an embodiment of the present invention.

The device 200 according to an embodiment of the present invention may include a web server. The device 200 may provide a webpage to the user terminals 10, receive an inquiry search word from the user terminals 10 through the webpage, and then transmit an answer keyword to the user terminals 10 as a search result of the inquiry search word. FIG. 2 illustrates a smart phone and a computer as the user terminals 10, but the user terminal 10 is not limited thereto and may include any one of various terminal devices connectable to the device 200 through a certain network, such as a personal digital assistant (PDA), a laptop, and a tablet personal computer (PC).

Hereinafter, a method of providing, by the device 200, an answer keyword to the user terminals 10, according to an embodiment of the present invention will be described in detail with reference to FIG. 3.

Figure 3:
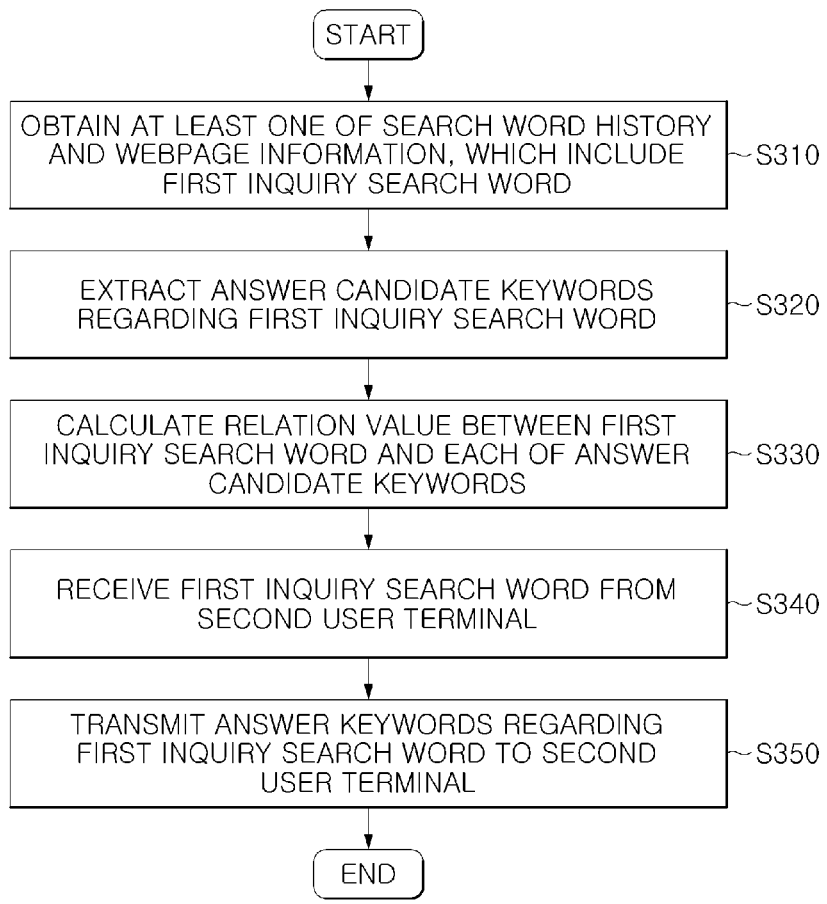
FIG. 3 is a flowchart of a method of providing an answer keyword, according to an embodiment of the present invention.

FIG. 3 is a flowchart of a method of providing an answer keyword, according to an embodiment of the present invention.

In operation S310, the device 200 obtains at least one of a search word history including a first inquiry search word of a certain domain pre-received from first user terminals, and webpage information selected by the first user terminals from a search result according to the search word history. The first user terminals may be the plurality of user terminals 10 described in FIG. 1.

The domain denotes a category for classifying the first inquiry search word pre-received from the first user terminals, and for example, may include a gift domain, a movie domain, a music domain, or the like.

Whether a search word pre-received from the first user terminals is an inquiry search word may be determined via any one of various methods. For example, if a certain keyword (for example, a gift, a movie, or a song) is included in a search word received from the first user terminals, the search word may be determined as an inquiry search word.

The device 200 may obtain at least one of the search word history including the first inquiry search word, and the webpage information selected by the first user terminals from a log record of each of the first user terminals.

The search word history denotes a list of search words continuously received within a certain time interval from a point in time when the first inquiry search word is received from each of the first user terminals. For example, when the first inquiry search word of "birthday gift for mom" is received from any one of the first user terminals, and then a search word of "scarf" is received within a certain period of time and a search word of "cosmetics" is received again after a certain period of time, "birthday gift for mon," "scarf," and "cosmetics" form the search word history. In the search word history, the first inquiry search word may not be necessarily received first. In other words, even when the search word of "scarf" is received, and then the first inquiry search word of "birthday gift for mom" is received after a certain period of time and the search word of "cosmetics" is received again after a certain period of time, "birthday gift for mom," "scarf," and "cosmetics" may form the search word history.

The webpage information denotes information about a webpage selected by each of the first user terminals when a search word included in the search word history is input on the webpage by each of the first user terminals and a search result is derived accordingly. For example, when a first user terminal inputs "birthday gift for mom" on the webpage and selects a blog webpage from search results found accordingly, the blog webpage selected by the first user terminal may be included in the webpage information of the present invention.

In operation S320, the device 200 extracts answer candidate keywords regarding the first inquiry search word from at least one of the search word history and the webpage information based on keyword lists of a certain domain.

The keyword lists of the certain domain may be pre-generated by the device 200. Keyword lists of a gift domain may include keywords that may correspond to gifts, and keyword lists of a movie domain may include keywords that may correspond to movie titles, actors, and directors.

The device 200 may extract the answer candidate keywords by matching the keyword lists of the certain domain and keywords included in at least one of the search word history and the webpage information. For example, when a search word history including the first inquiry search word of the gift domain includes keywords of "scarf," "cosmetics," and "amusement park," and a keyword list of the gift domain includes "scarf" and "cosmetics," the device 200 may only extract "scarf" and "cosmetics" as the answer candidate keywords.

In operation S330, the device 200 calculates a relation value between the first inquiry search word and each of the answer candidate keywords. For example, the relation value between the first inquiry search word and each of the answer candidate keywords may be calculated based on the frequency of each of the answer candidate keywords appearing or being included in at least one of the search word history and the webpage information. In other words, the answer candidate keywords included frequently in at least one of the search word history and the webpage information may have high relation values. A method of calculating the relation value will be described in detail later with reference to FIGS. 4 through 7.

In operation S340, the device 200 receives the first inquiry search word from a second user terminal.

In operation S350, the device 200 transmits answer keywords regarding the first inquiry search word, which are selected from the answer candidate keywords based on the relation value, to the second user terminal. The device 200 may select a certain number of answer keywords from the answer candidate keywords in an order from high to low relation value.

The device 200 may change the relation value of each of the answer candidate keywords before selecting the answer keywords from the answer candidate keywords. For example, when an answer candidate keyword of an upper concept exists in the answer candidate keywords, the relation value of the answer candidate keyword of the upper concept may be distributed to answer candidate keywords of the lower concept. The answer candidate keyword of the upper concept means an answer candidate keyword which could comprise meaning of other answer candidate keyword of lower concept. For example, if "apple," "banana" and "fruit" are the answer candidate keywords, the "fruit" could be the upper concept keyword which comprises the "apple" and "banana" as the lower concept. Also when at least two answer candidate keywords having a similar meaning exist in the answer candidate keywords, a relation value of an answer candidate keyword having a lower relation value may be decreased to be located later in the answer candidate keywords. As such, the relation values of the answer candidate keywords may be changed to provide various search results to a user.

Meanwhile, the device 200 may receive feedback of the second user terminal regarding the answer keywords after transmitting the answer keywords regarding the first inquiry search word to the second user terminal. For example, the device 200 may transmit a like or dislike menu regarding each of the answer keywords in the webpage to the second user terminal together with the answer keywords regarding the first inquiry search word, and then receive a like or dislike input regarding each of the answer keywords from the second user terminal. The device 200 may change the relation value of each of the answer keywords based on the feedback received from the second user terminal, and reselect the answer keywords regarding the first inquiry search word from the answer candidate keywords considering the changed relation values. In other words, the device 200 according to an embodiment of the present invention may select an answer keyword to be provided to users by reflecting preference of the users.

Figure 4:
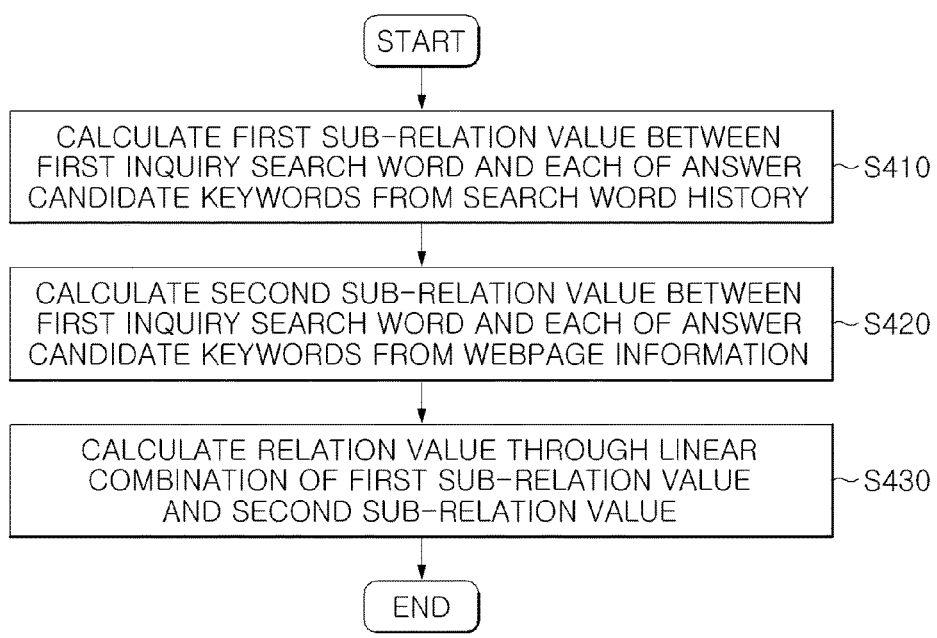
FIG. 4 is a flowchart illustrating in detail operation S340 of FIG. 3.

Hereinafter, the method of calculating the relation value will be described in detail with reference to FIG. 4. FIG. 4 is a flowchart illustrating in detail operation S340 of FIG. 3.

In operation S410, the device 200 calculates a first sub-relation value between the first inquiry search word and each of the answer candidate keywords based on the frequency of the answer candidate keywords being included in the search word history. The device 200 may calculate the first sub-relation value by considering a pointwise mutual information (PMI) index and a mutual information (MI) index of each of the answer candidate keywords, and a distance value between the first inquiry search word and each of the answer candidate keywords in the search word history, based on the frequency of the answer candidate keywords being included in the search word history.

In operation S420, the device 200 calculates a second sub-relation value between the first inquiry search word and each of the answer candidate keywords based on the frequency of each of the answer candidate keywords being included in the webpage information. The device 200 may calculate the second sub-relation value by calculating a PMI index and an MI index of each of the answer candidate keywords based on the frequency of the answer candidate keywords being included in the webpage information.

In operation S430, the device 200 calculates the relation value between the first inquiry search word and each of the answer candidate keywords through linear combination of the first sub-relation value and the second sub-relation value.

FIG. 5 is a table of answer candidate keywords extracted from a search word history of first user terminals, FIG. 6A is a table showing the frequency of the answer candidate keywords being included in the search word history, and FIG. 6B is a table of distance indexes between the answer candidate keywords and a first inquiry search word.

As described above, the device 200 extracts answer candidate keywords from a search history including a first inquiry search word of "gift for mother", for example, received from first user terminals A through D.

Then, the device 200 calculates the frequency of each of the answer candidate keywords being included in the search word history as shown in FIG. 6A. Also, the device 200 calculates distance values between the first inquiry search word and the answer candidate keywords in the search word history and then calculates distance indexes based on the calculated distance values, as shown in FIG. 6B. The distance value is a value indicating how far an order of inputting each of the answer candidate keywords is from an order of inputting the first inquiry search word. For example, when the first inquiry search word of "gift for mother" is input by the first user terminal C in FIG. 5, and then search words of "Daks scarf," "laptop," and "cell phone" are input in the stated order, a distance value between "gift for mother" and "Daks scarf" is 1, a distance value between "gift for mother" and "laptop" is 2, and a distance value between "gift for mother" and "cell phone" is 3.

The distance index is a value obtained by squaring a reciprocal of each of the distance values of the certain answer candidate keywords in the search word history of the plurality of first user terminals, and then adding the result values. When the distance index shown in FIG. 6B is high, the distance value between the first inquiry search word and the answer candidate keyword is low.

The device 200 may calculate a PMI index of each of the answer candidate keywords according to Equation 1 below.

$$pmi(q, e) = \log\left(\frac{freq(q, e) * freq(\text{total})}{freq(q) * freq(e)}\right) - \sqrt{\frac{1}{freq(q, e)} + \frac{1}{freq(q)} + \frac{1}{freq(e)} + \frac{1}{freq(\text{total})}}$$ [Equation 1]

$q$ = query $e = entity_{(\text{from\_query\_history})}$ $Q = (q_1, q_2, q_3, \cdots q_k)$ $E = (e_1, e_2, e_3, \cdots e_n)$ In Equation 1, query denotes the first inquiry search word, and for example, may be "gift for mother." Entity denotes a certain answer candidate keyword regarding the first inquiry search word, and for example, may include "cosmetics." Also, Q denotes a group of inquiry search words included in a certain domain, and may include inquiry search words included in a gift domain, such as "gift for mother" and gift for mother-in-law." Also, E denotes a group of answer candidate keywords regarding the first inquiry search word, and may include "cosmetics" and "scarf." freq(q,e) denotes a frequency of a certain answer candidate keyword being included in the search history including the first inquiry search word, freq(q) denotes a frequency of receiving the first inquiry search word for a certain period of time, freq(total) denotes a total of the frequency of receipt of each of inquiry search words included in Q for a certain period of time, and freq(e) denotes a frequency of a certain answer candidate keyword in the search word history including each of inquiry search word included in Q.

Also, the device 200 may calculate an MI index of each of the answer candidate keywords according to Equation 2 below.

$$mi(q, e) = \frac{freq(q, e)}{freq(q)} * \log\left(\frac{freq(q, e) * freq(\text{total})}{freq(q) * freq(e)}\right)$$ [Equation 2]

Then, the device 200 may calculate a first sub-relation value according to Equation 3 below.

$$assoc(q, e) = pmi(q, e) * mi(q, e) * \text{weight}(q, e) \quad \text{[Equation 3]}$$

$$assoc_h(q, e) = \frac{assoc(q, e)}{\max_i(assoc(q, e_i))}$$

$$\text{weight}(q, e) = \frac{\text{sum\_of\_dist}(q, e)}{freq(q, e)} * \text{content\_score}(e)$$

In Equation 3, assoc(q,e) denotes the first sub-relation value between the first inquiry search word and the certain answer candidate keyword, and $assoc_h(q,e)$ denotes a value obtained by normalizing the first sub-relation value to maximum 1. Also, weight(q,e) denotes a weight, wherein sum_of_dist(q,e) denotes a distance index and content_score (e) denotes an arbitrary weight considering popularity of the certain answer candidate keyword.

Then, the device 200 may calculate a PMI index and an MI index of each of the answer candidate keywords based on the frequency of each of the answer candidate keywords in the webpage information, and then calculate a second sub-relation value. For example, the device 200 may calculate the PMI index, the MI index, and the second sub-relation value according to Equation 4 below.

$$pmi(q, e) = \log\left(\frac{freq(q, e) * freq(\text{total})}{freq(q) * freq(e)}\right) - \quad \text{[Equation 4]}$$

$$\sqrt{\frac{1}{freq(q, e)} + \frac{1}{freq(q)} + \frac{1}{freq(e)} + \frac{1}{freq(\text{total})}}$$

$$mi(q, e) = \frac{freq(q, e)}{freq(q)} * \log\left(\frac{freq(q, e) * freq(\text{total})}{freq(q) * freq(e)}\right)$$

$$assoc(q, e) = pmi(q, e) * mi(q, e) * \text{content\_score}(e)$$

$$assoc_d(q, e) = \frac{assoc(q, e)}{\max_i(assoc(q, e_i))}$$

In Equation 4, freq(q,e) denotes a frequency of a certain answer candidate keyword being included in a webpage selected from a search result regarding the search history including the first inquiry search word, freq(q) denotes a frequency of receipt of the first inquiry search word for a certain period of time, freq(total) denotes a total of frequency of receipt of each of inquiry search word included in Q for a certain period of time, and freq(e) denotes a frequency of the certain answer candidate keyword being included in the webpage selected from the search result regarding the search word history including each of the inquiry search words included in Q. Also, assoc(q,e) denotes a second sub-relation value between the first inquiry search word and the certain answer candidate keyword, and $assoc_d$(q,e) is a value obtained by normalizing the second sub-relation value to maximum 1. Also, content_score(e) denotes an arbitrary weight considering popularity of the certain answer candidate keyword.

The device 200 calculates the relation value between the first inquiry search word and the certain answer candidate keyword by using the first sub-relation value and the second sub-relation value. This will be described with reference to FIG. 7.

FIG. 7 is a diagram for describing a method of calculating a final relation value 730 by using a first sub-relation value 710 and a second sub-relation value 720.

As shown in FIG. 7, the device 200 may calculate the final relation value 730 through linear combination of the first sub-relation value 710 and the second sub-relation value 720. In detail, the device 200 may calculate the final relation value 730 ($assoc_{hd}$(q,e)) according to Equation 5 below.

$$assoc_{hd}(q, e) = \alpha(assoc_h(q, e)) + \beta(assoc_d(q, e)), \ \alpha + \beta = 1 \quad \text{[Equation 5]}$$

In Equation 5, α and β respectively denotes weights applied to the normalized first sub-relation value 710 and the normalized second sub-relation value 720.

FIG. 8 is a flowchart of a method of revising a relation value in a method of providing an answer keyword, according to an embodiment of the present invention. The revising of the relation value is characterized in grouping inquiry search words similar to a first inquiry search word. This is to prevent abusing in which a certain person continuously inputs a certain search word to unfairly increase the relation value between the certain word and the first inquiry search word.

In operation S810, the device 200 extracts a second inquiry search word excluding the first inquiry search word pre-received by first user terminals, from at least one of a search word history and a web page, which include the first inquiry search word. For example, when the first inquiry search word of "birthday gift for mother" is received by the first user terminal, an inquiry search word excluding "birthday gift for mother," such as "gift for mom," "gift for mother-in-law," or the like, is extracted, as the second inquiry search word, from at least one of the search word history and the web page.

In operation S820, the device 200 calculates similarity value between the first inquiry search word and each of the second inquiry search words based on a frequency of each of the second inquiry search words in at least one of the search word history and the webpage. The device 200 may determine first sub-similarity value between the first inquiry search word and each of the second inquiry search words from the search word history and determine second sub-similarity value between the first inquiry search word and each of the second inquiry search words from webpage information, and then determine a final similarity value. The second inquiry search word existing frequently in at least one of the search word history and the webpage may have high similarity value with the first inquiry search word.

In operation S830, the device 200 selects a third inquiry search word to be included in a first similar search word group together with the first inquiry search word, from the second inquiry search words, based on the calculated similarity value. The device 200 may select a certain number of second inquiry search words in an order of higher similarity value as the third inquiry search words.

In operation S840, the device 200 revises the relation value calculated above between the first inquiry search word and each of the answer candidate keywords of the first inquiry search word, based on a relation value between the third inquiry search word and each of answer candidate keywords of the third inquiry search word. The device 200 may extract the answer candidate keywords of the third inquiry search word according to the method described above, and calculate the relation value between the third inquiry search word and each of the extracted answer candidate keywords. In other words, the device 200 may extract the answer candidate keywords from at least one of a search word history including the third inquiry search word pre-received from the first user terminals, and a webpage selected by the first user terminals from search results regarding the search word history, and then calculate the relation value between the third inquiry search word and each of the extracted answer candidate keywords.

A method of calculating the similarity value and a method of revising the relation value between the first inquiry search word and each of the answer candidate keywords of the first inquiry search word will be described in detail with reference to FIGS. 9A, 9B, 10 and 11.

Figure 10:
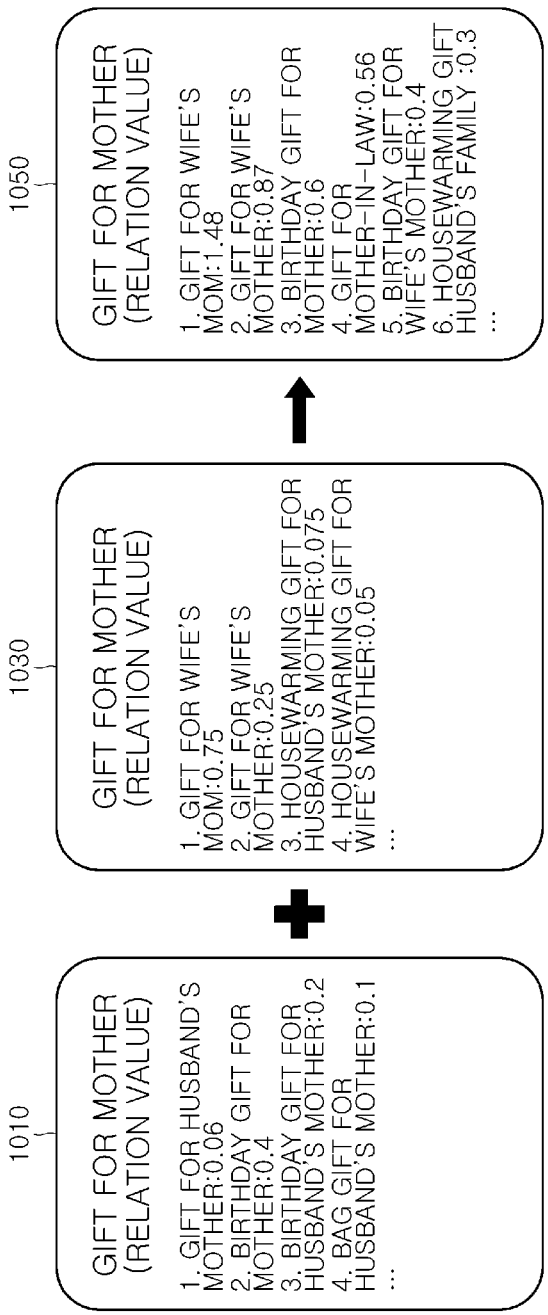
FIG. 10 is a diagram for describing a method of calculating a similarity value by using a first sub-similarity value and a second sub-similarity value.
Figure 11:
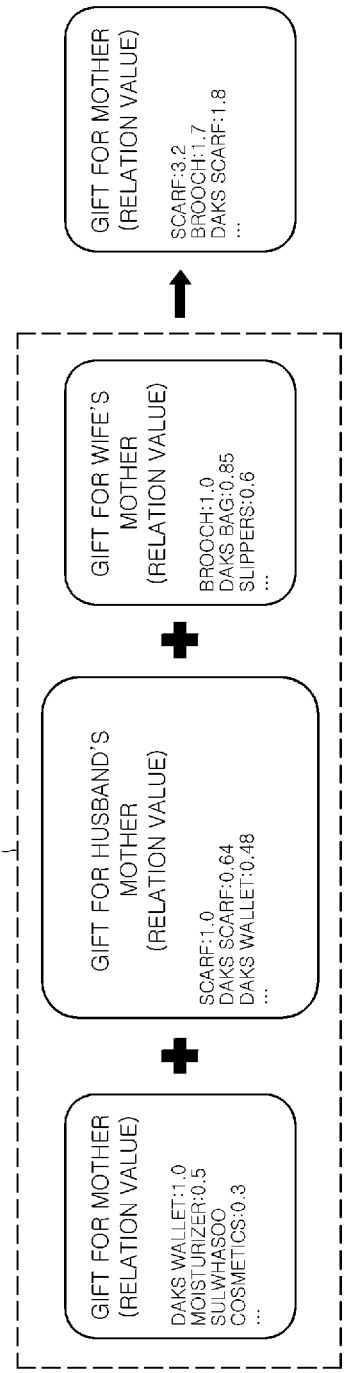
FIG. 11 is a diagram for describing a method of revising relation values between a first inquiry search word and answer candidate keywords corresponding to the first inquiry search word by using a first similar search word group.

FIG. 9A is a table of inquiry search words included in a search history received from a first user terminal, FIG. 9B is a table showing the frequency of second inquiry search words being included in a search history, FIG. 10 is a diagram for describing a method of calculating a similarity value by using a first sub-similarity value and a second sub-similarity value, and FIG. 11 is a diagram for describing a method of revising relation values between a first inquiry search word and answer candidate keywords corresponding to the first inquiry search word by using a first similar search word group.

First, as shown in FIG. 9A, the device 200 extracts an inquiry search word from a search history including a first inquiry search word pre-received from first user terminals. For example, a search history pre-received from first user terminal A includes inquiry search words of "gift for mother," "birthday gift for mother," and "bag gift for mother." "Gift for mother" from among the inquiry search words may be the first inquiry search word, and "birthday gift for mother" and "bag gift for mother" may be second inquiry search words.

Then, as shown in FIG. 9B, the device 200 calculates a frequency of each of the second inquiry search words included in the search word history. The device 200 may normalize the frequency of each of the second inquiry search words to maximum 1 to calculate first sub-similarity value of the first inquiry search word and each of the second inquiry search words.

Then, the device 200 calculates a frequency of each of the second inquiry search words included in webpage information. The device 200 may normalize the frequency of each of the second inquiry search words to maximum 1 to calculate second sub-similarity value of the first inquiry search word and each of the second inquiry search words.

After determining the first sub-similarity value and the second sub-similarity value, the device 200 may determine a similarity value between the first inquiry search word and each of the second inquiry search words. Referring to FIG. 10, the device 200 may determine a similarity value 1050 between a first inquiry search word and each of second inquiry search words through linear combination between a first sub-similarity value 1010 and a second sub-similarity value 1030.

Then, as shown in FIG. 11, when a first similar search word group 1100 regarding a first inquiry search word of "gift for mother" includes "gift for husband's mother" and "gift for wife's mother," the device 200 calculates relation values between "gift for husband's mother" and answer candidate keywords of "gift for husband's mother," and calculates relation values between "gift for wife's mother" and answer candidate keywords of "gift for wife's mother." Next, the device 200 may revise relation values of answer candidate keywords included in "gift for mother" through linear combination of the relation values of answer candidate keywords included in "gift for mother," "gift for husband's mother," and "gift for wife's mother."

FIGS. 12A and 12B are tables for describing a method of revising similarity values between a first inquiry search word and second inquiry search words. The similarity values between the first inquiry search word and the second inquiry search words are revised to expand a third inquiry search word that may be included in a first similar search word group.

As shown in FIG. 12A, the device 200 may determine a second similar search word group of each of the second inquiry search words according to the method described above. In other words, the device 200 extracts search words excluding the second inquiry search word from at least one of a search word history and a webpage, which include the second inquiry search word pre-received by first user terminals. Then, the device 200 may select an inquiry search word to be included in the second similar search group together with the second inquiry search word by calculating similarity values between the second inquiry search words and the extracted search words based on a frequency of each of the extracted search words in the search word history and the webpage.

As shown in FIG. 12B, the device 200 calculates the number of inquiry search words commonly existing in a first similar search word group including "gift for mother," i.e., the first inquiry search word, and the second similar search word groups including the second inquiry search word. When the first similar search word group including "gift for mother," i.e., the first inquiry search word, includes "gift for mom," "gift for mom in sixties," "gift for husband's mother," "gift for mother in fifties," and "gift for wife's mother," and the second similar search word group including "gift for husband's mother," i.e., the second inquiry search word, includes "gift for mother," "gift for wife's mom," and "gift for wife's mother," the number of inquiry search words commonly existing in the first similar search word group and the second similar search word group is 3 ("gift for mother," "gift for husband's mother," and "gift for wife's mother").

Referring to FIG. 12B, 20 common inquiry search words exist between the first similar search word group including "gift for mother" and the second similar search word group including "gift for husband's mom," and 30 common inquiry search words exist between the first similar search word group including "gift for mother" and a second similar search word group including "birthday gift for mom."

The device 200 may determine a third sub-similarity value between the first inquiry search word and each of the second inquiry search words by normalizing the numbers of inquiry search words commonly existing in the first similar search word group and the second similar search word groups to maximum 1. When the number of commonly existing inquiry search words is high, the third sub-similarity value between the first inquiry search word and the second inquiry search word is high. This is because there may be many common inquiry search words between similar search word groups of inquiry search words having a high similarity value.

Lastly, the device 200 may revise the similarity value through linear combination of the third sub-similarity value and the similarity value between the first inquiry search word and each of the second inquiry search words calculated in FIG. 10, and then select the third inquiry search word to be included in the first similar search word group together with the first inquiry search word, based on the revised similarity value.

Figure 13:
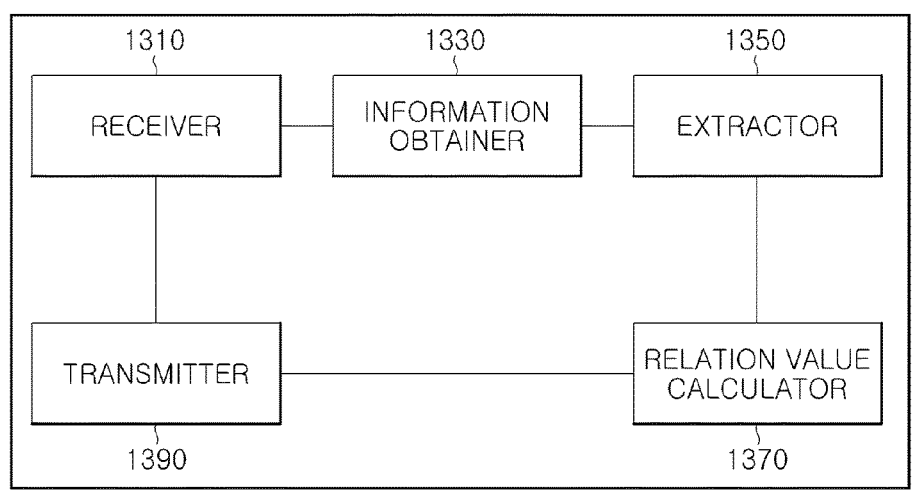
FIG. 13 is a block diagram of a structure of a device for providing an answer keyword, according to an embodiment of the present invention.

FIG. 13 is a block diagram of a structure of the device 200 for providing an answer keyword, according to an embodiment of the present invention. Referring to FIG. 13, the device 200 according to an embodiment of the present invention includes various units including a receiver 1310, an information obtainer 1330, an extractor 1350, a relation value calculator 1370, and a transmitter 1390.

The information obtainer 1330 obtains at least one of a search word history including a first inquiry search word pre-received from first user terminals, and webpage information selected by the first user terminals from search results of the search word history. The information obtainer 1330 may obtain at least one of the search word history including the first inquiry search word pre-received from the first user terminals, and the webpage information selected by the first user terminals from the search results of the search word history, from log records regarding the first user terminals.

The extractor 1350 extracts answer candidate keywords regarding the first inquiry search word from at least one of the search word history and the webpage information, based on keyword lists of a certain domain. The extractor 1350 may extract second inquiry search words excluding the first inquiry search word from at least one of the search word history and the webpage.

The relation value calculator 1370 calculates a relation value between the first inquiry search word and each of the extracted answer candidate keywords. The relation value calculator 1370 may calculate the relation value based on frequencies of the answer candidate keywords in at least one of the search word history and the webpage information. In detail, the relation value calculator 1370 may calculate first sub-relation values between the first inquiry search word and the answer candidate keywords based on the frequencies of the answer candidate keywords in the search word history and distance values between the first inquiry search word and the answer candidate keywords, calculate second sub-relation values between the first inquiry search word and the answer candidate keywords based on the frequencies of the answer candidate keywords in the webpage information, and then calculate the relation value between the first inquiry search word and each of the answer candidate keywords through linear combination of the first sub-relation value and the second sub-relation value.

Also, the relation value calculator 1370 may select a certain number of answer keywords from the answer candidate keywords in an order from high to low relation value.

The relation value calculator 1370 may change the relation value of each of the answer keywords according to feedback of the first user terminal regarding the answer keywords, and reselect the answer keywords from the answer candidate keywords based on the changed relation value of each of the answer keywords.

Also, the relation value calculator 1370 may select a third inquiry search word included in a first similar search word group from the second inquiry search words based on similarity values between the first inquiry search word and the second inquiry search words, and revise the relation value between the first inquiry search word and each of the answer candidate keywords of the first inquiry search word based on a relation value between the third inquiry search word and each of answer candidate keywords of the third inquiry search word.

The receiver 1310 receives the first inquiry search word from a second user terminal.

The transmitter 1390 transmits answer keywords of the first inquiry search word, which are selected from the answer candidate keywords based on the relation value, to the second user terminal.

Meanwhile, the embodiments of the present invention described above may be drafted into computer-executable programs, and may be embodied within a conventional digital computer for operating the program using a computer-readable recording medium.

The computer-readable recording medium may include storage media such as a magnetic storage medium (e.g., ROMs, floppy disks, hard disks, etc.), an optically readable medium (e.g., CD ROMs, DVDs, etc.), and a carrier wave (e.g., transmission via the internet).

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

The invention claimed is:

1. A method of providing an answer keyword, by a device having a processor, to a user terminal, the method comprising:
   obtaining at least one of a search word history comprising a first inquiry search word of a certain domain pre-received from first user terminals, and webpage information selected by the first user terminals from a search result according to the search word history;
   extracting answer candidate keywords regarding the first inquiry search word from at least one of the search word history and the webpage information based on keyword lists of the certain domain;
   calculating a relation value between the first inquiry search word and each of the extracted answer candidate keywords; and
   when the first inquiry search word is received from a second user terminal, transmitting answer keywords for the first inquiry search word, which are selected from the answer candidate keywords based on the relation value, to the second user terminal.

2. The method of claim 1, wherein the calculating of the relation value comprises selecting a certain number of the answer keywords from the answer candidate keywords in an order from high to low relation value.

3. The method of claim 1, further comprising:
   changing a relation value of each of the answer keywords according to a feedback of the second user terminal regarding the transmitted answer keywords; and
   reselecting the answer keywords from the answer candidate keywords based on the changed relation value of each of the answer keywords.

4. The method of claim 1, wherein the calculating of the relation value comprises calculating the relation value based on a frequency of the answer candidate keywords being included in at least one of the search word history and the webpage information.

5. The method of claim 1, wherein the calculating of the relation value comprises:
   calculating a first sub-relation value between the first inquiry search word and the answer candidate keywords based on a frequency of the answer candidate keywords being included in the search word history;
   calculating a second sub-relation value between the first inquiry search word and the answer candidate keywords based on a frequency of the answer candidate keywords being included in the webpage information; and
   calculating the relation value through linear combination of the first sub-relation value and the second sub-relation value.

6. The method of claim 5, wherein the calculating of the first sub-relation value comprises further considering a distance value between the first inquiry search word and the answer candidate keywords in the search history.

7. The method of claim 1, wherein the calculating of the relation value comprises:
   extracting second inquiry search words excluding the first inquiry search word from at least one of the search word history and the webpage information;
   calculating a similarity value between the first inquiry search word and each of the extracted second inquiry search words based on a frequency of each of the second inquiry search words being included in at least one of the search word history and the webpage information;
   selecting a third inquiry search word from the second inquiry search words, which is to be included in a first similar search word group together with the first inquiry search word, based on the similarity value; and
   revising the calculated relation value between the first inquiry search word and each of the answer candidate keywords of the first inquiry search word based on a relation value between the third inquiry search word and each of answer candidate keywords of the third inquiry search word.

8. The method of claim 7, wherein the selecting of the third inquiry search word comprises:
   revising the similarity value between the first inquiry search word and each of the second inquiry search words based on a number of inquiry search words commonly existing in the first similar search word group and a second similar search word group of each of the second inquiry search words; and
   selecting the third inquiry search word based on the revised similarity value.

9. A non-transitory computer-readable medium comprising an executable program, wherein the program, when executed by a computer, performs a method comprising:
   obtaining at least one of a search word history comprising a first inquiry search word of a certain domain pre-received from first user terminals, and webpage information selected by the first user terminals from a search result according to the search word history;
   extracting answer candidate keywords regarding the first inquiry search word from at least one of the search word history and the webpage information based on keyword lists of the certain domain;
   calculating a relation value between the first inquiry search word and each of the extracted answer candidate keywords; and
   when the first inquiry search word is received from a second user terminal, transmitting answer keywords for the first inquiry search word, which are selected from the answer candidate keywords based on the relation value, to the second user terminal.

10. A device for providing an answer keyword to a user terminal, the device comprising:
    an information obtainer configured to obtain at least one of a search word history comprising a first inquiry search word of a certain domain pre-received from first user terminals, and webpage information selected by the first user terminals from a search result according to the search word history;
    an extractor configured to extract answer candidate keywords regarding the first inquiry search word from at least one of the search word history and the webpage information based on keyword lists of the certain domain;
    a relation value calculator configured to calculate a relation value between the first inquiry search word and each of the extracted answer candidate keywords;
    a receiver configured to receive the first inquiry search word from a second user terminal; and
    a transmitter configured to transmit answer keywords for the first inquiry search word, which are selected from the answer candidate keywords based on the relation value, to the second user terminal.

11. The device of claim 10, wherein the relation value calculator selects a certain number of the answer keywords from the answer candidate keywords in an order from high to low relation value.

12. The device of claim 10, wherein the relation value calculator changes a relation value of each of the answer keywords according to a feedback of the second user terminal regarding the transmitted answer keywords, and reselects the answer keywords from the answer candidate keywords based on the changed relation value of each of the answer keywords.

13. The device of claim 10, wherein the relation value calculator calculates the relation value based on a frequency of the answer candidate keywords being included in at least one of the search word history and the webpage information.

14. The device of claim 10, wherein the relation value calculator calculates a first sub-relation value between the first inquiry search word and the answer candidate keywords based on a frequency of the answer candidate keywords being included in the search word history, calculates a second sub-relation value between the first inquiry search word and the answer candidate keywords based on a frequency of the answer candidate keywords being included in the webpage information, and calculates the relation value through linear combination of the first sub-relation value and the second sub-relation value.

15. The device of claim 14, wherein the relation value calculator calculates the first sub-relation value by further considering a distance value between the first inquiry search word and the answer candidate keywords in the search history.

16. The device of claim 10, wherein the extractor extracts second inquiry search words excluding the first inquiry search word from at least one of the search word history and the webpage information, and
    the relation value calculator calculates similarity value between the first inquiry search word and each of the extracted second inquiry search words based on a frequency of each of the second inquiry search words in at least one of the search word history and the webpage information, selects a third inquiry search word from the second inquiry search words, which is to be included in a first similar search word group together with the first inquiry search word, based on the similarity value; and revises the calculated relation value between the first inquiry search word and each of the answer candidate keywords of the first inquiry search word based on a relation value between the third inquiry search word and each of answer candidate keywords of the third inquiry search word.

17. The device of claim 16, wherein the relation value calculator revises the similarity value between the first inquiry search word and each of the second inquiry search words based on a number of inquiry search words commonly existing in the first similar search word group and a second similar search word group of each of the second inquiry search words, and selects the third inquiry search word based on the revised similarity value.

* * * * *